(12) United States Patent
Sannier

(10) Patent No.: US 9,064,187 B2
(45) Date of Patent: Jun. 23, 2015

(54) METHOD AND SYSTEM FOR ITEM IDENTIFICATION

(75) Inventor: Gael Sannier, Brent (CH)

(73) Assignee: SICPA HOLDING SA, Prilly (CH)

( * ) Notice: Subject to any disclaimer, the term of this patent is extended or adjusted under 35 U.S.C. 154(b) by 708 days.

(21) Appl. No.: 13/124,059

(22) PCT Filed: Oct. 13, 2009

(86) PCT No.: PCT/EP2009/063350
§ 371 (c)(1),
(2), (4) Date: Jul. 11, 2011

(87) PCT Pub. No.: WO2010/043618
PCT Pub. Date: Apr. 22, 2010

(65) Prior Publication Data
US 2011/0262036 A1    Oct. 27, 2011

(30) Foreign Application Priority Data
Oct. 14, 2008    (WO) .................. PCT/IB2008/002718

(51) Int. Cl.
*G06K 9/00*    (2006.01)
*G06K 9/62*    (2006.01)
*G06K 9/46*    (2006.01)

(52) U.S. Cl.
CPC ............ *G06K 9/6212* (2013.01); *G06K 9/4642* (2013.01)

(58) Field of Classification Search
None
See application file for complete search history.

(56) References Cited

U.S. PATENT DOCUMENTS

| | | | |
|---|---|---|---|
| 4,177,482 A * | 12/1979 | Henry | ........................... 348/131 |
| 4,493,105 A | 1/1985 | Beall et al. | |
| 5,793,642 A | 8/1998 | Frisch et al. | |
| 6,512,577 B1 * | 1/2003 | Ozanich | ........................ 356/73 |
| 6,536,667 B2 * | 3/2003 | Gehring et al. | .......... 235/462.31 |
| 6,757,428 B1 | 6/2004 | Lin et al. | |
| 7,039,255 B2 | 5/2006 | Lee et al. | |
| 2002/0102018 A1 | 8/2002 | Lin et al. | |
| 2004/0218837 A1 | 11/2004 | Shiyama | |
| 2004/0228526 A9 | 11/2004 | Lin et al. | |
| 2006/0015494 A1 | 1/2006 | Keating et al. | |
| 2006/0015495 A1 | 1/2006 | Keating et al. | |
| 2006/0015496 A1 | 1/2006 | Keating et al. | |
| 2006/0015497 A1 | 1/2006 | Keating et al. | |
| 2006/0020597 A1 | 1/2006 | Keating et al. | |
| 2006/0023947 A1 * | 2/2006 | Rising, III | ..................... 382/190 |
| 2006/0092274 A1 * | 5/2006 | Good | ............................. 348/61 |
| 2009/0154812 A1 | 6/2009 | Schmitt | |

FOREIGN PATENT DOCUMENTS

| | | |
|---|---|---|
| CA | 1197607 | 12/1985 |
| JP | 07-071939 | 3/1995 |

(Continued)

OTHER PUBLICATIONS

Fukumoto, "A Method for Color and Structure based Image Retrieval", ITE Technical Report, vol. 25, No. 24, The Institute of Image Information and Television Engineers, pp. 71-76.

(Continued)

*Primary Examiner* — Chan Park
*Assistant Examiner* — Eueng-Nan Yeh
(74) *Attorney, Agent, or Firm* — Greenblum & Brenstein P.L.C.

(57) ABSTRACT

The disclosed method and the corresponding system for identifying an item on a production line according to the invention relies on color histograms established from a digital image of the item, which are compared, on a bin per bin basis, with minimum and maximum numbers of pixels per bin allowed for identification with a reference item.

22 Claims, 5 Drawing Sheets

(56) References Cited

FOREIGN PATENT DOCUMENTS

| JP | 07-234971 | 9/1995 |
|---|---|---|
| JP | 2004-70861 | 3/2004 |
| JP | 2005-121368 | 5/2005 |
| TW | 571246 | 1/2004 |
| WO | 2007/099076 | 9/2007 |

OTHER PUBLICATIONS

Japanese Office action conducted in counterpart Japanese Appln. No. 2011-531471 (Jul. 25, 2013) (w/ English language translation).

ISO/IEC18004 (First Edition). (Jun. 15, 2000).

A Redacted English language Summary of Colombia Office action conducted in counterpart Colombia Appln. No. 11043553 (May 31, 2013).

Israel Office action conducted in counterpart Israel Appln. No. 212187 (Jan. 13, 2013) (with redacted English language letter reporting the action).

Eurasian Office action conducted in counterpart Eurasian Appln. No. 201170558/31 (Feb. 28, 2013) (with partial English language translation).

Australian Office action conducted in Australian Appln. No. 2009305437 (Mar. 24, 2014).

Taiwan Office Action conducted in counterpart Taiwan Appln. No. 098133948 (Jul. 31, 2014) (w/ English translation).

\* cited by examiner

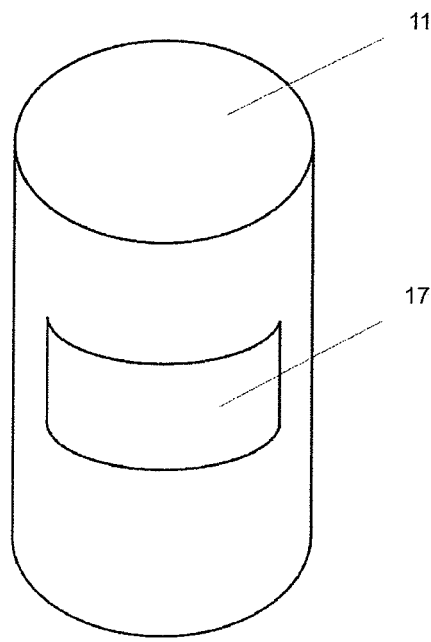
Fig. 5
Fig. 6
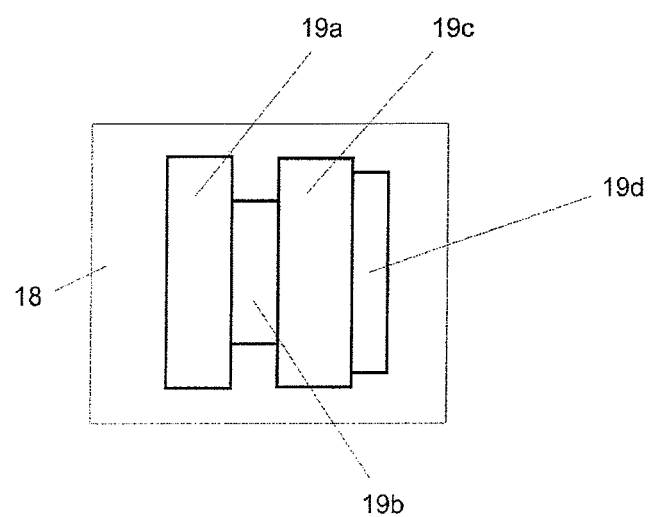

METHOD AND SYSTEM FOR ITEM IDENTIFICATION

TECHNICAL FIELD

The present invention relates to the technical field of control systems for automated production lines. More particularly, the invention relates to imaging devices and corresponding real-time image processing means and methods used for production control on said production lines. These image processing means extract color information from digital images of items (i.e. products and/or packages) on the production line, in order to identify different types of items by comparing the extracted information with template information of reference items.

BACKGROUND OF THE INVENTION

Imaging devices are of common use for controlling production on automated production lines. For example, on bottling lines, strobe light (using LED lighting unit controlled by a laser trigger device, for example) illuminates bottles transported on a conveyor, and digital cameras take digital images of the so illuminated bottles; image processing means then automatically detect an outline of the bottles on these digital images and identify different types of bottles (from their shape and/or dimensions) present on the conveyor. Such identification is used, for example, for correctly labeling the bottles according to their type (shape or content, etc.).

Image processing means can also detect colors printed on labels comprised on a packaging of the item, or on the item itself (for example, on the bottles produced on a bottling line), or directly printed onto the item, e.g. a container (for example, on cans produced on a canning line), so as to allow packaging inspection and/or pattern identification (for example, identifying brand pattern through its matching with a template image). For example, on canning lines, brand patterns can furthermore be printed either directly onto the cans or onto sleeves which fit tightly around the cans.

There are many known techniques relating to image retrieval and processing (in the field of content-based image retrieval) which can be used for identifying or inspecting an item from its digital image. However, these techniques either lack precision or involve time consuming calculations, and are thus not fully adapted for automated production line control, particularly on high speed production lines.

For example, the classical thresholding technique in the RGB color space ("Red Green Blue") lacks precision as it does not allow separating color information from intensity information.

As another example, US patent application US 2004/0218837 A1 discloses an image processing technique wherein a digital image of an item is first segmented into blocks, and for each block a color histogram and a brightness (luminance) histogram are established. An average brightness is further determined from the brightness histogram, for each block, as a brightness feature information, and a representative color (for example, an average color) is determined from the color histogram, for each block, as a color feature information. Then, a comparison between color feature information of the digital image and color feature information of a target comparison image is performed (on a block-by-block basis) so as to decide whether the digital image is similar to the target image. If the comparison of colors is not conclusive, a further comparison between color feature information of the digital image and color feature information of the target comparison image is performed (also on a block-by-block basis).

However, such image processing technique has the inconvenience that the determination of the representative color and the average brightness for each block, both, involve a heavy calculation load (at least for determining the said two histograms) and the use of only one or both of these "average" parameters for estimating the similarity may not be precise enough in the context of a high speed production line (for example, for identifying a packaging or a brand on a packaging).

Imaging systems have been recently developed in order to identify items based on color features in a HSL ("Hue Saturation Luminance") color space, extracted from digital images of these objects in the context of assembly and packaging inspection applications.

For example, US patent application US 2004/0228526 A9 discloses a system for color characterization using "fuzzy pixel classification" with application in color matching and color match location. This system uses color feature vectors for measuring the similarity between color images, based on a distance between color feature vectors, and for locating regions of a target image of which color information matches that of a template image. A color feature vector is herein constituted by the percentage of pixels assigned to each bin (i.e. color category) of a HSL color histogram of the target image based on HSL values of the respective pixels (i.e. each bin corresponding to values of hue, saturation and luminance), a pixel having a weight fractionally distributed across a plurality of bins, according to a "fuzzy membership function" of a "fuzzy pixel classification".

However, such "fuzzy pixel classification" within a HSL histogram (with bins in a three-dimensional HSL space) and the subsequent similarity determination have the inconvenience to be highly demanding in computing resources. Thus, this image processing technique is not well adapted to real-time item identification on high speed production lines, especially if every single item passing on the line needs to be identified.

SUMMARY OF THE INVENTION

In view of the above mentioned limitations of the background art, the present invention is therefore aimed at providing a robust real-time system and a corresponding method for identifying an item from a digital image. An object of the invention is to provide a production control tool which is well adapted to high speed production lines carrying items of a plurality of types, whilst being capable of processing digital images of every single item passing on the line, for precise identification based on color analysis by comparison with characteristic features from reference identification data, all necessitating only limited computing resources.

Another object of the invention is to provide a system and a method which are also capable of producing reference data, to be used for further identification processing of an item.

Still another object of the invention is to securely identify an item on the production line.

A further object of the identification system and method according to the invention is to allow identifying a plurality of items on a high-speed production line, even in cases where there is no gap between neighboring items and/or apparent partial views (on the digital images) of these items, such as corresponding to rotated positions of bottles or cans transported on a conveyor.

A method for identifying an item according to a first aspect of the invention comprises the steps of:

a) selecting at least one zone of a digital image of said item; and
b) for each zone selected at step a), establishing a corresponding histogram of color values of the pixels of said zone,
c) for each bin of each histogram established at step b), comparing the number of pixels with corresponding minimum and maximum reference values of a reference data set associated to a reference item, and determining whether said number of pixels is comprised between said reference values; and
d) identifying the item as corresponding to said reference item if said number of pixels is comprised between said reference values for at least N of said bins, with N≥1, of at least one zone.

The above method of identification needs only limited computing resources for identifying an item, and allows fast processing compatible with real-time applications, as only one-dimensional color histograms (for example for hue values) are established and used for comparison with a reference data set, corresponding to a reference item, and comprising only two scalar values, i.e. a minimum number of pixels and maximum number of pixels, for each color bin. This limited amount of data nevertheless allows precise item identification.

According to another aspect of the invention, at step d) of the above method, an item is further identified as fully corresponding to the reference item if said number of pixels is comprised between said reference values for each bin of each histogram of each zone. This full correspondence condition in fact allows a highly precise identification of the item, even if the digital image only relates to a limited area on the item.

The invention also allows estimating a partial similarity between an item and a reference item. In this case, the above method according to the first aspect of the invention further comprises the step of:

e) identifying the item as being partially similar to said reference item based on similarity score values associated to the bins if said number of pixels is not comprised between said reference values for each bin of each histogram of each zone, a similarity score value associated to a bin of an established histogram being all the more low as the number of pixels for said bin is far below the corresponding minimum reference value or far above the corresponding maximum reference value.

Such scoring allows to finely estimate a similarity between the item and the reference item, even in case where, for some bins of the histogram relating to the item, the numbers of pixels do not fall within the corresponding reference values, due to a local defect on the control area (for example, a print defect in a printed brand pattern or an alteration of certain colors in said printed brand pattern).

According to a further aspect of the invention, it is possible to use digital images obtained not only from the visible spectrum, but also from other parts of the electromagnetic spectrum (UV or IR spectral ranges for example), by attributing different colors to different parts of this spectrum (i.e. forming "false" color images), and then using a sort of HSL representation, based on the attributed colors, for the pixels of the digital image. In the general case, the color values used in the present invention need thus not to correspond to the three-dimensional CIELAB representation of human color vision, but can be based on arbitrary spectral bands selected from the UV, visible and IR parts of the item's reflection spectrum. Any number of such spectral bands can furthermore be selected.

Moreover, in order to allow a more precise identification, information relating to saturation and luminance may also be used. Nevertheless, due to the above mentioned low computational cost constraint, an improvement over the use of conventional HSL histograms (i.e. histograms in a 3-dimensional space) appears desirable.

According to this aspect of the invention, in the above mentioned method, wherein the pixels of said digital image, having each a corresponding luminance value, saturation value and hue value associated to a color among a finite set of colors, each color of the set of colors corresponding to a distinct spectral response, the step b) of calculating a histogram further comprises the steps of:

b1) among the pixels within said zone having each a saturation value above a given saturation threshold value and for each color of the set of colors, counting a number of pixels of which the hue value for that color is comprised between two given hue threshold values defining a bin for that color to obtain a number of saturated pixels for said color;
b2) among the pixels within said zone which are not saturated pixels, counting a number of pixels of which the luminance value is below a given luminance threshold value, to obtain a corresponding number of black pixels, and counting a number of pixels of which the luminance value is above said luminance threshold value, to obtain a corresponding number of white pixels; and
b3) based on the calculated numbers of saturated pixels for each color of the set of colors and the calculated numbers of black pixels and white pixels, calculating a distribution of the pixels according to the colors of the set of color, the black and the white, thereby forming the histogram for said zone.

Thus, according to the above aspect the invention, the color histogram may be completed with black and white pixels on the basis of the saturation and luminance information, but remains a one-dimensional color histogram, thereby allowing increased precision for identification at a still low computational cost.

The method of the invention may also comprise a further conventional step of outline detection, followed by a comparison with a reference outline, so as to validate an identification at step d) in case of matching of the outlines. More precisely, the invention may comprise the further step of detecting an outline of the item on the digital image and comparing said detected outline with a reference outline corresponding to the reference item; and wherein identification of the item at step d) is further validated only if said detected outline matches said reference outline.

In another aspect, the invention allows identifying items which are close together or even in contact. The invention indeed allows to suppress possible "overlapping" effects due to the presence, on a same digital image, of pixel data relating to two or more items (which were in the view field when the digital image was acquired). Accordingly, the method for identifying an item according to the invention may further comprise the steps of detecting an outline of the item on the digital image and, at step a), selecting the at least one zone so that any selected zone is within the detected outline of the item. This feature of the invention assures that image content of any zone of an acquired digital image of an item on the production line only relates to this very item, even if it was in contact with neighboring items on the production line. Bottling lines or canning lines are well known examples of production lines wherein the items (i.e. bottles or cans) are typically transported aligned on a conveyor, two consecutive items being in contact with each other. The invention thus allows to precisely identify each item with imaging means by making sure that data on any acquired digital image exclusively relates to a single item, even on high speed lines.

Alternatively, the digital image of the item may be restricted to a control area on the item which is within an apparent outline of said item. For example, in case the item is a cylindrical can standing vertically on a conveyor, the control area may be a mere strip on the cylindrical surface of the can. Such a restriction of the digital image, so as to eliminate pixel data not concerning the control area, may be performed in several ways. For example, by framing the digital image and not taking into account pixel data from outside said frame (the frame corresponding to a contour of the control area). As another example, a mask (or any means for restricting the overall view field) may be used when acquiring the digital image so that the pixels on the digital image only relate to the control area on the item. As a result, the digital image content in fact relates to only one item.

The invention also offers the possibility of directly determining the reference data from a reference digital image of the reference item.

Accordingly, the method of the invention may further comprise a step of calculating said reference data set from a reference digital image of said reference item, by executing the steps a) and b) for the reference digital image so as to establish for each zone of the reference digital image a reference histogram, and associating minimum and maximum reference values to each bin of each established reference histogram, each of said minimum and maximum reference values being obtained from a corresponding confidence interval.

Said possibility is important for easily adapting a reference data set to a segmentation of the digital image in a preferred set of zones. This possibility is also important for easily adapting a reference data set to special circumstances concerning the items to be identified. For example, in case that several similar items to be identified on a production line have angular positions rotated within a range of possible angular values when their digital images are respectively acquired, precise identification of an item is still possible, even if only a single digital image per item is acquired.

For example, in the latter case, for each bin of each zone of the digital image, the corresponding minimum and maximum reference values may be determined from a set of reference digital images of the reference item, corresponding to various rotated angular positions of said reference item according to angular values within the above mentioned range, by counting the minimum number of pixels and the maximum number of pixels for the concerned bin and zone over the corresponding color histograms of the set of reference digital images.

Of course, a better precision in the identification of an item will be obtained if the number of sampled angular values of rotated positions of the reference item and/or the number of zones in the digital image are larger. For example, on a calming line, the (cylindrical) cans carried on a conveyor may have rotated positions (around their cylinder axis) in the range of 0 to 360 degrees. Thus, with at least two reference digital images, corresponding to respective positions of a reference can rotated by an angle of 180 degrees, precise identification of a can, based on minimum and maximum reference values obtained from these at least two reference images (and thus associated to the reference item), becomes possible from even only one digital image of that can.

The above mentioned confidence intervals (one for each color of the histogram), for determining the minimum and maximum reference values for the numbers of pixels, may in fact result from any other statistical treatment of the color values of the pixels of each reference digital image from the set of reference digital images (for example by weighting the count of pixels according to the bin and/or the zone considered).

Instead of validating item identification (at step d)) if a detected outline of the item matches a reference outline (see above), the invention according to any previous aspect may further comprise the steps of:

detecting a pattern on the digital image and comparing the detected pattern with a given reference pattern corresponding to the reference item, and estimating if said detected pattern matches the reference pattern; and further using a result of the item identification operation for authenticating said detected pattern, if it is estimated that said detected pattern matches the reference pattern.

In the above aspect of the invention, an identification of the item by full image processing (based on one-dimensional color histograms, as already explained) serves for authenticating a pattern matching. This is particularly advantageous if said pattern matching results from an error (for example, if the pattern detected on the digital image of the item indeed corresponds to a reference pattern but not to the item).

The invention also concerns a system for identifying an item which is operable to implement the method for identifying an item according to the invention, and also the use of said system for identifying an item on a production line, as defined in the appended claims.

Particularly, the use of a system for identifying an item on a production line is disclosed, this system comprising a digital image processing unit including a memory and operable to:

select at least one zone of a digital image of said item;

establish, for each selected zone, a corresponding histogram of color values of the pixels of said zone, said digital image processing unit being further operable to:

compare, for each bin of each established histogram, the number of pixels with corresponding minimum and maximum reference values of a reference data set stored in the memory and associated to a reference item, and determine whether said number of pixels is comprised between said reference values; and identify the item as corresponding to said reference item if said number of pixels is comprised between said reference values for at least N of said bins, with N≥1, of at least one zone.

The present invention will be described more fully hereinafter with reference to the accompanying drawings in which like numerals represent like elements throughout the several figures, and in which prominent aspects and features of the invention are illustrated.

BRIEF DESCRIPTION OF THE DRAWINGS

FIG. 5 illustrates a control area on the surface of the item shown in FIG. 4

FIG. 6 illustrates a digital image of the control area shown in FIG. 5, as taken by the imaging unit of FIG. 4.

DETAILED DESCRIPTION

Figure 1:
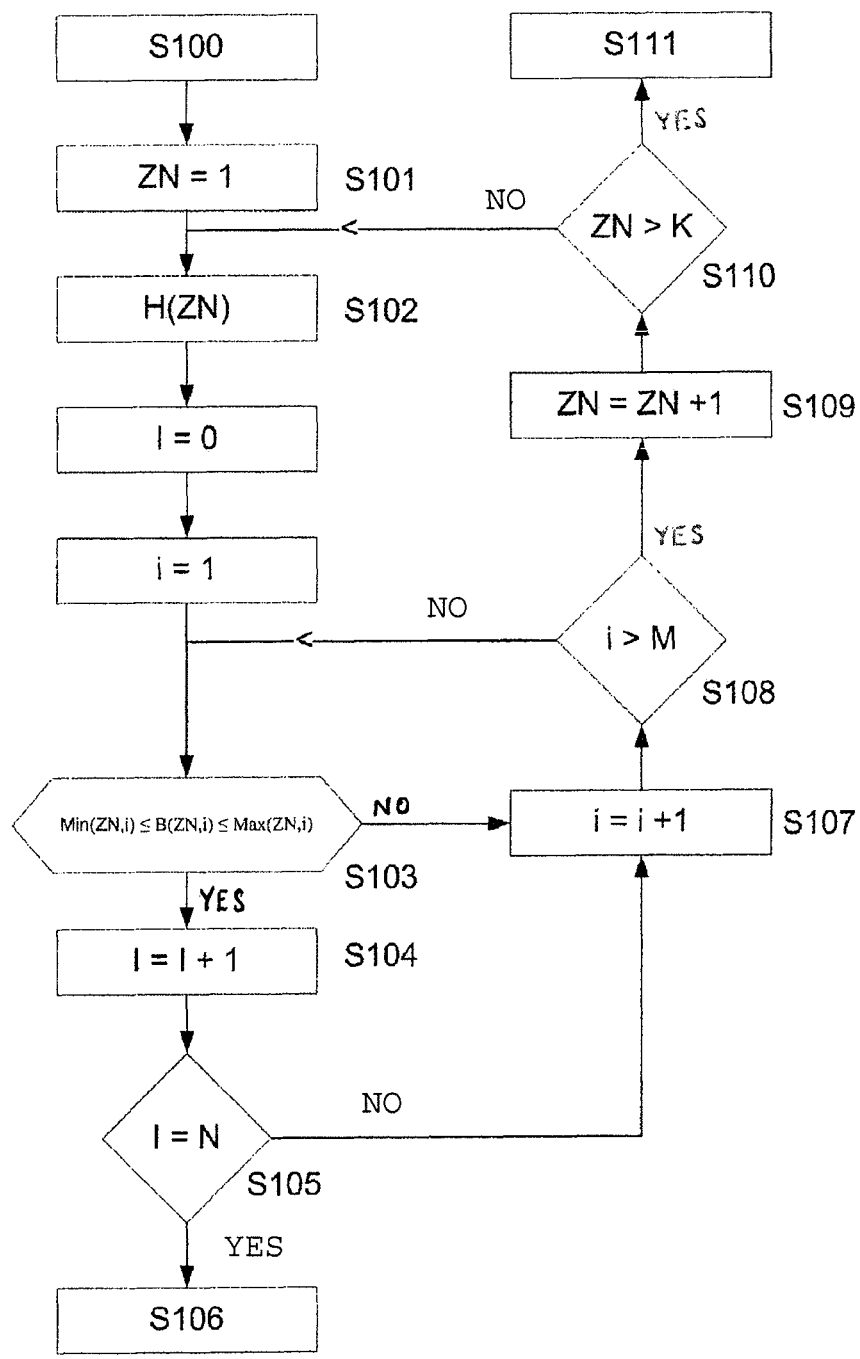
FIG. 1 is a flowchart diagram illustrating an embodiment of the method for identifying an item according to the invention.
Figure 2:
FIG. 2 illustrates a digital image segmented into a plurality of zones.

In the method for identifying an item illustrated by the flowchart diagram of FIG. 1, a digital image of an item to be identified is divided into K zones (K≥1), as represented on FIG. 2 (zones (1) are indicated, with K=4). Hereinafter, ZN is a zone index with 1≤ZN≤K, "i" is a bin index with 1≤i≤M, so that a color histogram corresponding to a zone ZN, i.e. H(ZN), comprises M bins corresponding to M distinct color values, and B(ZN,i) is the number of pixels corresponding to the ith bin of the histogram H(ZN) of zone ZN. For each bin "i" of each zone ZN, two reference values Min(ZN,i) and Max(ZN,i), respectively correspond to a minimum number of pixels and a maximum number of pixels, set for identification of the item with a reference item of which these reference values constitute characteristic features (the reference data set, i.e. the set of all the pairs of reference values, in fact constitutes a "signature" of the reference item in terms of colored brand pattern). Of course, the histograms may be normalized as usual so that any B(ZN,i) in fact corresponds to a percentage of pixels in bin (i) of zone ZN (in this case, the reference values also are normalized).

Figure 3:
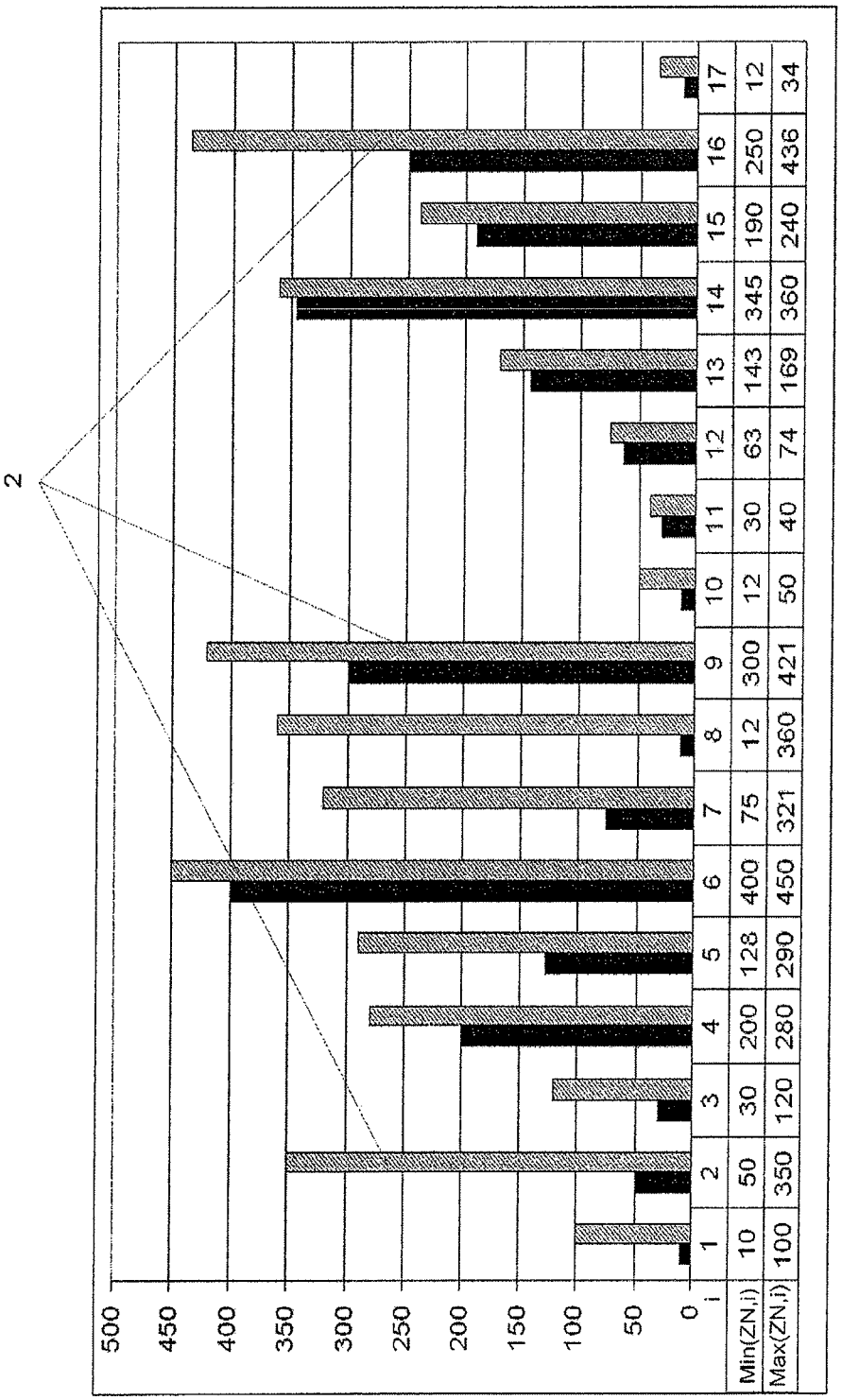
FIG. 3 illustrates a reference data set corresponding to bins of a color histogram.

An example of a reference data set is shown in FIG. 3. In this example, for each bin B(ZN,i) of a zone ZN, with i=1, . . . , M=17, corresponding pairs (2) of values of the numbers of pixels Min(ZN,i) and Max(ZN,i) are given and respectively illustrated with histograms (2). The seventeen bins correspond in fact to fifteen color bins, plus two bins for black and for white pixels.

According to the flowchart of FIG. 1, after a start step S100 and initialization step S101 of the zone index ZN at 1, corresponding to the selection of the first zone of the digital image, the color histogram H(ZN=1) is established. Thus, the numbers of pixels in each bin of H(1) are counted by digital image processing means and the set of said numbers corresponding to H(1) (i.e. B(1,i), for i=1, . . . , M) is obtained at step S102. At step S103, for a current bin B(1,i) of H(1), it is tested if its number of pixels is comprised between the reference values corresponding to B(1,i), i.e. if the condition Min(1,i)≤B(1,i)≤Max(1,i) is realized. In case the condition with respect to the reference values is realized for a bin, a number I of realizations of the condition is incremented at step S104, so as to count the overall number of such realizations when testing the condition for the various bins of the histogram. As soon as this number I reaches a given threshold value N (with: 1≤N≤K×M) (step S105) for identification with the reference item, in at least one zone among the K zones of the digital image, the item is taken for identified with the reference item (step S106). In case the condition is not realized at step S105, the next bin (i+1) of histogram H(ZN) is considered at step S107: if this next bin index does not exceed the value M (step S108), the condition with this next bin (i+1) is tested at step S103 with the corresponding pair of reference values Min(ZN,i+1) and Max(ZN,i+1). In case the threshold value N is not attained for the histogram H(ZN), and thus for zone ZN, a next zone (ZN+1) of the digital image is then considered at step S109: if this zone index value does not exceed the value K(step S110), the corresponding next histogram H(ZN+1) is calculated at step S102, and the condition for its bins B(ZN+1,i) is tested (with corresponding pair of reference values Min(ZN+1,i) and Max(ZN+1,i)) is tested at step S103.

In case all the bins (i.e. for i=1, . . . , M) of all the zones (i.e. for ZN=1, . . . , K) are explored without obtaining N realizations of the condition, the item is taken for not identified with the reference item (step S111).

The above mentioned condition for identification may be made more restrictive, by replacing it with the following condition of full correspondence with the reference item: the condition Min(ZN,i)≤B(ZN,i)≤Max(ZN,i) must be realized for i=1, . . . , M and ZN=1, . . . , K, i.e. the number of pixels is comprised between the reference values for each bin of each histogram of each zone.

This more restrictive condition in fact corresponds to the case N=K×M (i.e. the maximal value of N, for a given number K of zones and a given number M of bins in each histogram, with one histogram per zone).

In practical applications, it is sometimes useful to detect only partial similarity with the reference item instead of full correspondence. Indeed, if a full correspondence cannot be established, the various calculations carried out in fact contain information which may nevertheless relate to significant facts: for example, a presence of defects on the item (precluding full correspondence), or the possibility that the item belongs to a same family as the reference item. For example, for a same brand on a product, small variations in the colors or the patterns on the items may correspond to different categories of a same product line (like, for example, in the case of cans, a same beverage with or without sugar addition).

The invention thus allows using a scoring technique for estimating partial similarity, in case a full correspondence is not established. The only constraint for such a scoring is that a similarity score of a bin (i) of a zone ZN, i.e. SC(ZN,i), must be all the more low as the number of pixels in that bin, i.e. B(ZN,i), is far from any of the two corresponding reference values Min(ZN,i) and Max(ZN,i). There are many possibilities for calculating this similarity score. For example, for each bin "i" of a zone ZN, it is possible to use a linear weighting corresponding to the mere difference D(ZN,i)=[Min(ZN,i)−B(ZN,i)], if B(ZN,i)≤Min(ZN,i), or D(ZN,i)=[B(ZN,i)−MAX(ZN,i)], if B(ZN,i)≥Max(ZN,i) (i.e. the weight is a linear function of the difference D (ZN,i)), then, a similarity score value may depend on the inverse of such weight (for example, a score proportional to 1/(1+D)). However, any other non-linear weighting is possible, as long as it is compatible with the above mentioned constraint. For example, a non-linear weight like $D^n$ (with n≥2) will further increase the similarity scores relating to small values of D.

Having formed these score values SC(ZN,i) for each zone and each bin (i.e. for i=1, . . . , M and ZN=1, . . . , K), there are also many ways to estimate partial similarity. For example, it is possible to retain only the highest score value over all the zones, or retain the highest score value over each zone and calculate an average score value over all the zones (possibly weighted, for example according to the respective area of the zones). However, a skilled person may consider many other possibilities for the statistical treatment of the various score values SC(ZN,i), in view of estimating partial similarity with a reference item from a digital image.

In a preferred embodiment, the method for identifying an item according to the invention uses "completed" one-dimensional histograms, based on a classical representation of the digital image in a HSL color space, as indicated above. The histogram has bins corresponding to distinct predefined hue values, but the saturation values and the luminance values are used for completing the histogram with an additional "bin" corresponding to black pixels and an additional "bin" corresponding to white pixels. Such a completed color histogram allows identifying items having dark parts and/or bright parts, and thus allows more precision for identification purpose.

For each zone of the digital image, a saturation threshold value is given, which may depend on the zone considered, and which serves for defining the saturated pixels (i.e. pixels of which saturation value is above the corresponding threshold value, whatever are their luminance values). Also, for each zone of the digital image, two hue threshold values are given per color of the histogram, which may depend on the zone considered. Each pair of given hue threshold values for a color in fact defines a bin of the histogram for that color (the two threshold values constituting the respective extreme hue values of the bin). The various pairs of given hue threshold values define a partition of the color (hue) space, and thus the color bins of the histogram.

These hue threshold values serve for counting the saturated pixels for each color (hue) of a zone of the digital image, i.e. for each predefined color of the histogram: the number of saturated pixels of which hue value is comprised between the corresponding two hue threshold values defines the number of saturated pixels for the corresponding color. Such pixels have thus a well defined color. These pairs of given hue threshold values may also depend on the reference item considered for identification.

Also, the number of non-saturated pixels of a zone having low luminance values, i.e. luminance values below a given luminance threshold value for that zone, which may depend on the zone considered, are counted as being black pixels for that zone. By contrast, the number of non-saturated pixels of a zone having high luminance values, i.e. luminance values above the given luminance threshold value for that zone, are counted as being white pixels for that zone. Accordingly, in this embodiment of the invention, a histogram has M+2 bins, i.e. the previous M bins corresponding to distinct hue values, and the two bins corresponding to black and white pixels. In this case the reference data set is also extended so as to include, for each zone, the minimum and maximum reference values for black pixels, and the minimum and maximum reference values for white pixels.

Of course, the identification condition at step d) also concerns the black pixels and the white pixels. In fact, the number of colors to be considered at step b) for a histogram is here simply increased by two, by defining the black and the white as two new colors. Accordingly, the full correspondence of an item with the reference item now necessitates a number $N'=K \times (M+2)=N+2K$ of realizations of the condition for full correspondence (i.e. the number of pixels is comprised between the reference values for each bin of each histogram of each zone). The same "extension" of the number of colors is also to be applied when considering partial similarity as specified above (i.e. similarity scores are also defined for the black and the white pixels on the basis of the respectively corresponding minimum and maximum reference values), or when calculating the reference data set from reference digital images as mentioned above.

If the digital images comprise extended spectral information, such as is the case of "false color images", the HSL representation is correspondingly adapted or extended to a more general color space.

In another embodiment of the invention, which may depend on any of the above mentioned aspects or embodiments of the invention, authentication of a pattern detected on a digital image is allowed.

The corresponding aspect of the method for identifying an item then further comprises the steps of:

detecting a pattern on the digital image and comparing the detected pattern with a given reference pattern corresponding to the reference item, and estimating if said detected pattern matches the reference pattern; and further using a result of the item identification operation for authenticating said detected pattern, if it is estimated that said detected pattern matches the reference pattern.

The above mentioned pattern on the item may well be a barcode or a text, for example. Then, detection of said pattern is respectively carried out by means of a barcode reader and OCR ("optical character recognition") software. The method thus allows using the identification phase from image processing (based on the color histograms and minimum and maximum reference values, as explained above) for making sure that a detected reference pattern, even if matching a given reference pattern corresponding to the reference item, is really a valid one. This aspect of the invention, by using such "double checking" by means of identification based on both color histograms (and corresponding reference values) and pattern matching with a reference pattern, clearly increases the quality of control of items on a production line. For example, the method allows detecting a fraud (like a barcode for an item of a certain type which is printed on an item of another type, for example).

The invention also concerns a system for identifying an item, which is operable to implement the steps of any of the above mentioned aspects or embodiments of the method according to the invention.

Accordingly, the system for identifying an item, generally comprises a digital image processing unit including a memory and is operable to:

select at least one zone of a digital image of said item;

establish, for each selected zone, a corresponding histogram of color values of the pixels of said zone, said digital image processing unit being further operable to: compare, for each bin of each calculated histogram, the number of pixels with corresponding minimum and maximum reference values of a reference data set stored in the memory and associated to a reference item, and determine whether said number of pixels is comprised between said reference values; and identify the item as corresponding to said reference item if said number of pixels is comprised between said reference values for at least N of said bins, with $N \geq 1$, of at least one zone.

Figure 4:
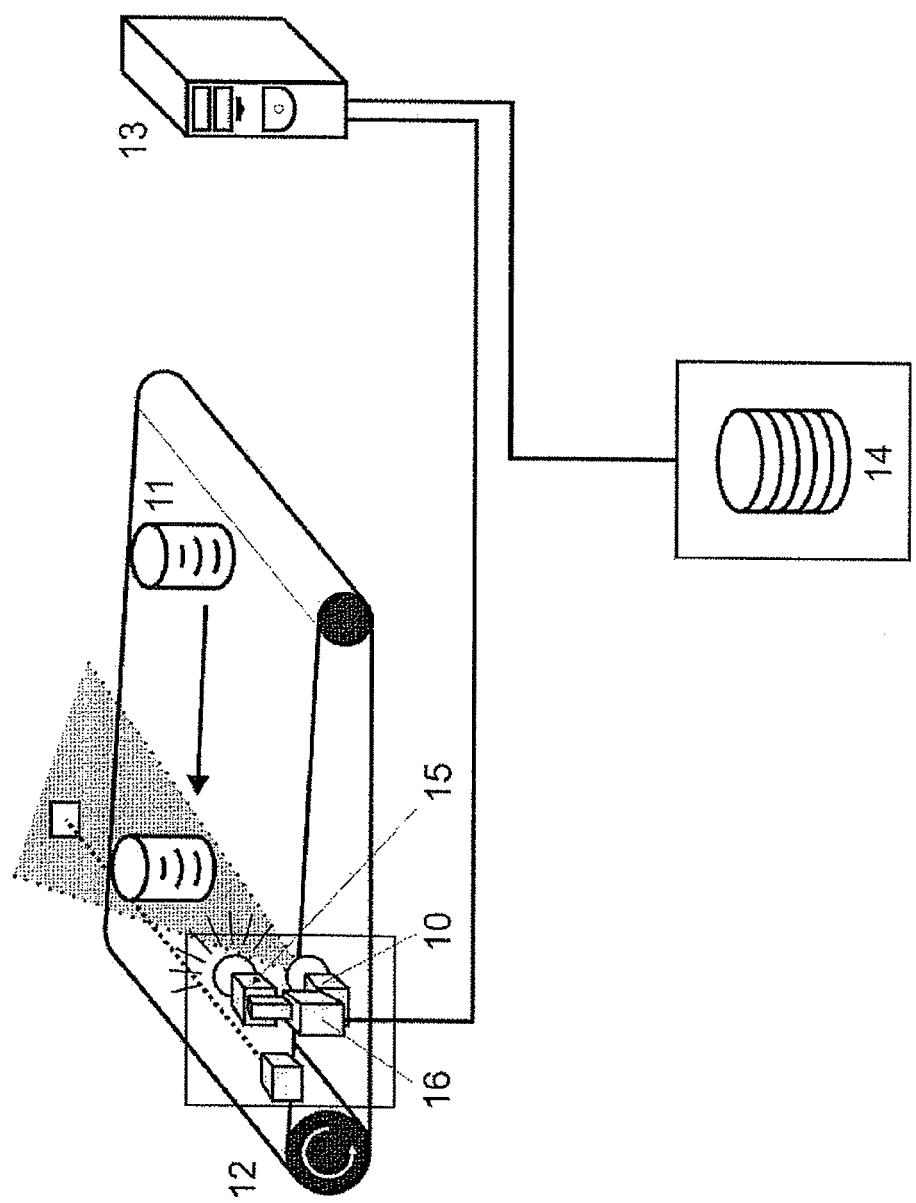
FIG. 4 illustrates an automated production line including a system for identifying an item according to an embodiment of the invention.

Particularly, in the automated production line including an example of a system for identifying an item according to the invention shown in FIG. 4, the system comprises an imaging unit (10) for acquiring a digital image of an item (11) (here, a can is represented) on a conveyor (12) of the production line, a digital image processing unit (13) for processing digital images received from the imaging unit (10) and a memory (14) for storing a reference data set. The system may also comprise an illumination unit (15) for illuminating the item (11) with strobe light.

A conventional example of such an illumination unit is an LED lighting unit or a laser strobe (for visible light). Other types of illumination units allow illuminating items over a broader spectrum (for example, ranging from IJV to IR light, i.e. from 300 nm to 2500 nm).

The imaging unit (10) may be a digital camera (a CCD camera or CMOS camera). However, an analog camera may also be used, if supplemented with a framegrabber analog-to-digital converter so as to produce a digital image format.

The system further comprises a control unit (16) operable to control the illumination unit (15), the imaging unit (10), and the digital image processing unit (13) so as to synchronize their operation for illuminating the item, forming the digital image of the illuminated item, and processing said digital image.

FIG. 5 shows a control area (17) on the surface of the item (11) and FIG. 6 illustrates a digital image (18) of the control area (17) of the item (11), as taken by the imaging unit (10). The digital image processing unit (13) divides the digital image (18) received from the imaging unit (10) into a plurality of zones (19a-19d) (here four zones as an example).

For each zone of the digital image (18), the digital image processing unit (13) determines a corresponding one-dimensional color histogram by dividing the color space (depending on the spectrum width of the photons the imaging unit is capable to measure) into M bins (for example, M=17, as represented in FIG. 3), and counting the number of pixels according to their hue values within each bin.

Preferably, the system may further comprise: sensor means operable to detect a location of the item relative to the imaging unit (10) at which said imaging unit is operable to form a digital image of the item, and to transmit a trigger signal indicating the detection of said location, wherein the control unit (16) is further operable to receive the trigger signal from the sensor means and to synchronize the operation of the illumination unit (15), imaging unit (10) and digital image processing unit (13) based on said received trigger signal.

Typically, the sensor means may be a laser trigger for high speed photography. This well known device allows very precise triggering of the imaging unit and is particularly adapted for production lines, such as canning lines or bottling lines, wherein a production rate as high as 1200 items per minute is possible.

By further controlling the field of the imaging unit, it is possible to change a size of a target control area on the imaged item. For example, if the production line is a bottling line or a canning line, the items on the line (resp. bottles and cans) may well be close or even in contact with each other. In this latter case, the field of the imaging unit may be restricted by means of a mask, so as to image only the control area (which correspond to a label on a bottle or an imprint on a can). This mode of the invention, which allows identification even if items are in contact, has been tested for visible light illumination on a high speed canning line (with 1200 cans per minute). Moreover, the reference values, including the black and the white, have been determined as explained above for a plurality of rotated positions of the cylindrical cans from 0 to 360 degrees (around the longitudinal axis of symmetry of the cans). Complete identification of our items has been obtained for beverage cans of ten distinct brands on a high speed production line, even at full correspondence condition.

The invention is not limited to the above embodiments and various modifications may be made without departing from the scope of the invention as defined by the claims. For example, the above mentioned imaging unit may be operable to acquire a plurality of digital images of a single item (corresponding to different view angles), and process each of said acquired images such as already explained for identifying the item.

The invention also includes a computer program product operable to make a computer connected to a system for identifying an item as described above implement the steps of the method according to the invention (as described above), when running on said computer.

The method and system for identifying every item on a production line according to the invention, in any of its above mentioned aspects, may be used with a high level of confidence for item identification in industry for many applications such as, for example, determining a production volume on said production line (for tax value estimation, etc. . . . ), line production control, line production inspection (for fraud detection, etc. . . . ).

The invention claimed is:

1. System for identifying an item, comprising a digital image processing unit including a memory and operable to:
  select at least one zone of a digital image of said item;
  establish, for each selected zone, a corresponding histogram of color values of the pixels of said zone,
  said digital image processing unit being further operable to:
  compare, for each bin of each established histogram, the number of pixels with corresponding minimum and maximum reference values of a reference data set stored in the memory and associated to a reference item, and determine whether said number of pixels is comprised between said reference values; and
  identify the item as corresponding to said reference item if said number of pixels is comprised between said reference values for at least N of said bins, with N≥1, of at least one zone.

2. The system according to claim 1, wherein the image processing unit is operable to identify the item as being fully corresponding to said reference item if said number of pixels is comprised between said reference values for each bin of each histogram of each zone.

3. The system according to claim 1, wherein the image processing unit is further operable to:
  calculate similarity score values associated to the bins if said number of pixels is not comprised between said reference values for each bin of each histogram of each zone, a similarity score value associated to a bin of a calculated histogram being all the more low as the number of pixels for said bin is far below the corresponding minimum reference value or far above the corresponding maximum reference value; and
  identify the item as being partially similar to said reference item based on the calculated similarity score values.

4. The system according to claim 1, comprising:
  an illumination unit, operable to illuminate the item with electromagnetic radiation of a given spectral range; and
  an imaging unit operable to convert said received electromagnetic signal corresponding to electromagnetic radiation reflected on the item illuminated by the illumination unit, into the digital image of the item, and operable to transmit said digital image to the digital image processing unit;
  wherein
  said image processing unit is operable to receive the digital image from the imaging unit; and
  the system further includes a unit controller configured to control said illumination unit, imaging unit and digital image processing unit so as to synchronize their operation for illuminating the item, forming the digital image of the illuminated item and processing said digital image.

5. The system according to claim 4, further comprising:
  a sensor operable to detect a location of the item relative to the imaging unit at which said imaging unit is operable to form a digital image of the item, and to transmit a trigger signal indicating the detection of said location,
  wherein the controller is further configured to receive a trigger signal from the sensor and to synchronize the operation of the illumination unit, imaging unit and digital image processing unit based on said received trigger signal.

6. The system according to claim 1, wherein the digital image processing unit is further operable to:
  process a reference digital image of said reference item, as for the digital image of the item, to establish for each zone of the reference digital image a reference histogram; and
  associate minimum and maximum reference values to each bin of each established reference histogram, each of said minimum and maximum reference values being obtained from a corresponding confidence interval.

7. The system according to claim 1, wherein the digital image processing unit is operable to:
  detect an outline of the item on the digital image and compare said detected outline with a reference outline corresponding to the reference item; and
  validate a result of the identification operation of the item only if said detected outline matches said reference outline.

8. The system according to claim 1, wherein the digital image processing unit is operable to:
  detect an outline of the item on the digital image; and
  select the at least one zone so that any selected zone is within the detected outline of the item.

9. The system according to claim 1, comprising an image mask configured to restrict the digital image of the item to a control area on the item which is within an apparent outline of said item.

10. The system according to claim 9, wherein the control area corresponds to a label on said item or an imprint on said item.

11. The system according claim 1, wherein the digital imaging unit is operable to:
  detect a pattern on the digital image and compare the detected pattern with a given reference pattern corresponding to the reference item, and estimate if said detected pattern matches the reference pattern; and
  authenticate said detected pattern, based on a result of the item identification operation, if it is estimated that said detected pattern matches the reference pattern.

12. Use of the system according to claim 1 for identifying an item on a production line.

13. A system for identifying an item, comprising a digital image processing unit including a memory and operable to:
  select at least one zone of a digital image of said item;
  establish, for each selected zone, a corresponding histogram of color values of the pixels of said zone,
  said digital image processing unit being further operable to:
  compare, for each bin of each established histogram, the number of pixels with corresponding minimum and maximum reference values of a reference data set stored in the memory and associated to a reference item, and determine whether said number of pixels is comprised between said reference values; and
  identify the item as corresponding to said reference item if said number of pixels is comprised between said reference values for at least N of said bins, with N≥1, of at least one zone,
  wherein, the pixels of said digital image having each a corresponding luminance value, saturation value and hue value associated to a color among a finite set of colors, each color of the set of colors corresponding to a distinct spectral response, the digital image processing unit is operable to, for calculating a histogram:
  count a number of pixels, among the pixels within said zone having each a saturation value above a given saturation value threshold and for each color of the set of colors, of which hue value for that color is comprised between two given hue threshold values defining a bin for that color to obtain a number of saturated pixels for said color;
  among the pixels within said zone which are not saturated pixels, count a number of pixels of which luminance value is below a given luminance threshold value to obtain a corresponding number of black pixels, count a number of pixels of which luminance value is above said luminance threshold value to obtain a corresponding number of white pixels, and store in the memory said obtained numbers of pixels; and
  calculate a distribution of the pixels according to the colors of the set of color, the black and the white, based on the calculated numbers of saturated pixels for each color of the set of colors and the calculated numbers of black pixels and white pixels, thereby forming the histogram for said zone.

14. Method for identifying an item, comprising the steps of:
  a) selecting at least one zone of a digital image of said item; and
  b) for each zone selected at step a), establishing a corresponding histogram of color values of the pixels of said zone,
  said method further comprising the steps of:
  c) for each bin of each histogram established at step b), comparing the number of pixels with corresponding minimum and maximum reference values of a reference data set associated to a reference item, and determining whether said number of pixels is comprised between said reference values; and
  d) identifying the item as corresponding to said reference item if said number of pixels is comprised between said reference values for at least N of said bins, with N≥1, of at least one zone.

15. The method according to claim 1, wherein, at step d), the item is identified as fully corresponding to said reference item if said number of pixels is comprised between said reference values for each bin of each histogram of each zone.

16. The method according to claim 1, further comprising the step of:
  e) identifying the item as being partially similar to said reference item based on similarity score values associated to the bins if said number of pixels is not comprised between said reference values for each bin of each histogram of each zone, a similarity score value associated to a bin of an established histogram being all the more low as the number of pixels for said bin is far below the corresponding minimum reference value or far above the corresponding maximum reference value.

17. The method according to claim 1, comprising a step of calculating said reference data set from a reference digital image of said reference item, by executing the steps a) and b) for the reference digital image so as to establish for each zone of the reference digital image a reference histogram, and associating minimum and maximum reference values to each bin of each established reference histogram, each of said minimum and maximum reference values being obtained from a corresponding confidence interval.

18. The method according to claim 1, comprising the step of:
  detecting an outline of the item on the digital image and comparing said detected outline with a reference outline corresponding to the reference item; and
  wherein identification of the item at step d) is further validated only if said detected outline matches said reference outline.

19. The method according to claim 1, comprising the steps of:
  detecting an outline of the item on the digital image and, at step a), selecting the at least one zone so that any selected zone is within the detected outline of the item.

20. The method according to claim 1, wherein the digital image of the item is restricted to a control area on the item which is within an apparent outline of said item.

21. The method according to claim 1, comprising the steps of:
   detecting a pattern on the digital image and comparing the detected pattern with a given reference pattern corresponding to the reference item, and estimating if said detected pattern matches the reference pattern; and
   further using a result of the item identification operation for authenticating said detected pattern, if it is estimated that said detected pattern matches the reference pattern.

22. A method for identifying an item, comprising the steps of:
   a) selecting at least one zone of a digital image of said item; and
   b) for each zone selected at step a), establishing a corresponding histogram of color values of the pixels of said zone,
   said method further comprising the steps of:
   c) for each bin of each histogram established at step b), comparing the number of pixels with corresponding minimum and maximum reference values of a reference data set associated to a reference item, and determining whether said number of pixels is comprised between said reference values; and
   d) identifying the item as corresponding to said reference item if said number of pixels is comprised between said reference values for at least N of said bins, with N≥1, of at least one zone,
   wherein, the pixels of said digital image having each a corresponding luminance value, saturation value and hue value associated to a color among a finite set of colors, each color of the set of colors corresponding to a distinct spectral response, the step b) of establishing a histogram further comprises the steps of:
   b1) among the pixels within said zone having each a saturation value above a given saturation value threshold and for each color of the set of colors, counting a number of pixels of which hue value for that color is comprised between two given hue threshold values defining a bin for that color to obtain a number of saturated pixels for said color;
   b2) among the pixels within said zone which are not saturated pixels, counting a number of pixels of which luminance value is below a given luminance threshold value to obtain a corresponding number of black pixels, and counting a number of pixels of which luminance value is above said luminance threshold value to obtain a corresponding number of white pixels; and
   b3) based on the calculated numbers of saturated pixels for each color of the set of colors and the calculated numbers of black pixels and white pixels, calculating a distribution of the pixels according to the colors of the set of color, the black and the white, thereby forming the histogram for said zone.

* * * * *

UNITED STATES PATENT AND TRADEMARK OFFICE
CERTIFICATE OF CORRECTION

PATENT NO. : 9,064,187 B2
APPLICATION NO. : 13/124059
DATED : June 23, 2015
INVENTOR(S) : G. Sannier Page 1 of 1

It is certified that error appears in the above-identified patent and that said Letters Patent is hereby corrected as shown below:

CLAIMS

Column 16, line 25 (claim 22, lines 42, 43) please change "set of color" to ---set of colors---

Signed and Sealed this
First Day of March, 2016

Michelle K. Lee
*Director of the United States Patent and Trademark Office*